Figure 1:
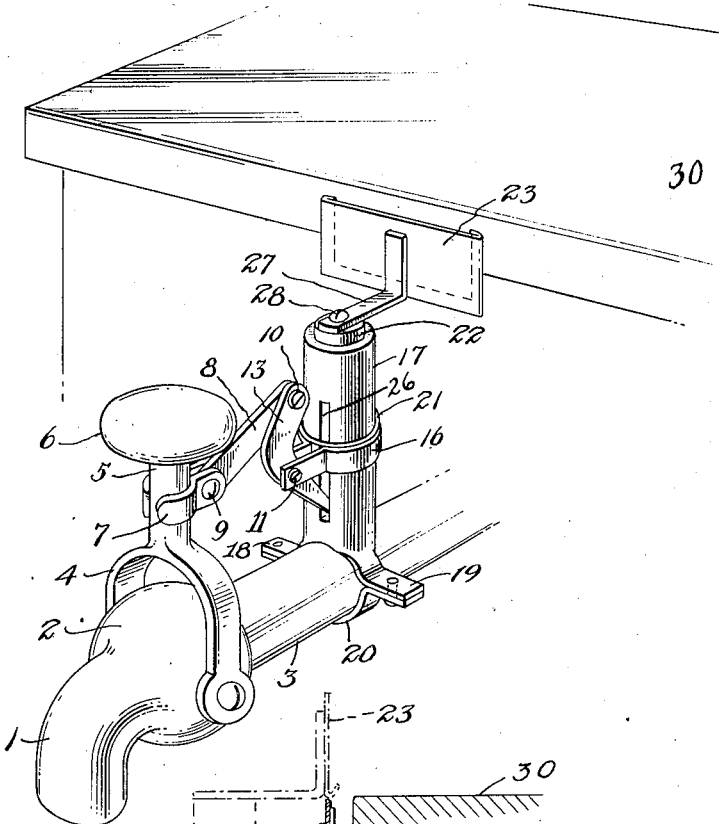

April 20, 1937.　　　E. J. MEUSNER　　　2,077,847

BEVERAGE INDICATOR

Filed Feb. 14, 1934

Inventor

Erik J. Meusner

By Fay Oberlin & Fay

Attorneys

Patented Apr. 20, 1937

2,077,847

UNITED STATES PATENT OFFICE 2,077,847

BEVERAGE INDICATOR

Erik J. Meusner, West Orange, N. J.

Application February 14, 1934, Serial No. 711,234

6 Claims. (Cl. 40—28)

This invention relating as indicated, to a beverage indicator, is more particularly directed to a means for preventing fraud in the dispensing of a beverage such as beer. The beverage beer will be used as an illustrative example but it is to be understood that the invention is applicable to any kind of liquid.

Another object of the invention is to provide a means of advertising the beverage being dispensed which is sure to attract the attention of a user. More specifically the invention has for its object the provision of some such means as a sign which is brought into the view of a user every time the faucet handle of a liquid dispensing device is operated. In this manner the attention of one ordering a glass of beer, for example, is immediately attracted, and at the same time the user is assured that he is being served a particular brand of beer he has requested.

Heretofore, beer faucets have for the most part been located beneath the upper surface of a bar or counter and when a particular type of beer is called for the user has no assurance of obtaining this type. Unscrupulous bar tenders have supplied a very cheap beer when an expensive beer is called for altho they have a faucet connected with the expensive beer. Attempts have been made to overcome this practice by the provision of elongated faucet handles which project above the upper surface of the bar, but such handles are rather awkward and are liable to be easily broken due to their projecting position. Furthermore, such handles are relatively expensive and when used require replacement of an entire faucet, whereas the device of my invention is quite inexpensive and may be attached to any existing faucet, while at the same time it is positioned in such a manner that its parts do not project into the path of a bar tender drawing and serving beer in an ordinary manner.

There have also been other attempts to combine advertising devices with faucet handles so that such devices are actuated upon movement of the handle, but these devices have either been too expensive due to their complicated structure or too flimsy to be of practical value. As far as I am aware I am the first to provide a beverage indicator which possesses the dual function of indicating and advertising the beverage being dispensed.

To the accomplishment of the foregoing and related ends, said invention, then, consists of the means hereinafter fully described and particularly pointed out in the claims; the annexed drawing and the following description setting forth in detail certain mechanism exemplifying my invention, such disclosed mechanism constituting, however, but one of various applications of the principle of my invention.

In said annexed drawing:—

Figure 2:
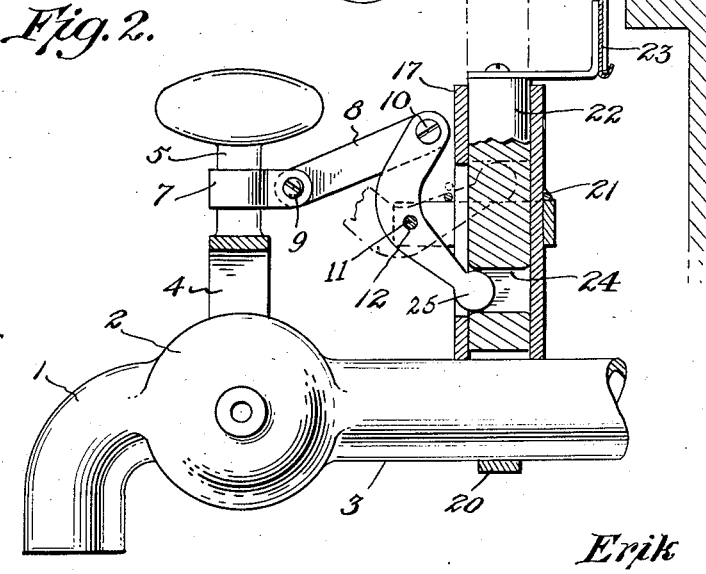

Fig. 1 is a perspective view and Fig. 2 is a side elevation with certain parts in section.

Referring now to the drawing it will be seen that a conventional faucet having an outlet portion 1, a valve chamber 2, and inlet portion 3 is positioned immediately back of a bar 30. This bar or counter 30 has its upper surface usually lying in a plane a slight distance above such faucet, but the invention is designed for use in conjunction with such a bar or one having an upper surface spaced at a different distance. A handle 6 is connected by means of a stem 5 and bifurcated portion 4 which is in turn connected to a valve within the chamber 2. A clamp 7 is secured to the stem 5 by means of a shouldered bolt 9 which permits pivotal movement of a link 8 with respect to the stem 5. The link 8 is in turn pivotally connected to a bell crank member 13 by means of a shouldered bolt 10 and the bell crank member 13 is pivotally mounted on bolt 11 inasmuch as it has an aperture 12 journalled upon such bolt. The bolt 11 is in turn mounted upon a clamp 16 which is secured to a cylinder 17 and the cylinder 17 has a pair of projecting arms 18 and 19 at its base. These projecting arms in conjunction with the pipe clamp member 20 permit adjustable anchoring of the cylinder 17 with respect to the inlet pipe 3. A barrel 22 is slidably mounted in the cylinder 17 so as to vertically reciprocate therein upon movement of the bell crank lever 13. One end of the bell crank lever 25 is rounded and slidably mounted in a vertically disposed recess 24 in the barrel 22. Oscillation of the bell crank 13 about the bolt 11 as a pivot is made possible through the provision of a slot 26 in the cylinder 17. A spring restricting means is illustrated in the form of a metallic ring 21 that is soldered to the clamp 16 and cylinder 17 at a point directly opposite the slot 26.

At the top of the barrel 22 an angle member 27 is mounted having one leg thereof secured to the barrel 22 by means of the bolt 28. The other end is secured to a sign holder 23 which is illustrated as facing the customer.

It will, of course, be understood that the sign or indicator may face either the customer across a bar as shown or if the faucet be mounted against a wall, as in small restaurant installations, the indicator will face both the operator and the customer. It is also to be understood that an indicator may be mounted upon both sides of the vertical leg of the angle member 27 and where this is done the device will have a third function of identifying the beer to the bar tender. This is extremely important in large installations where a great many brands of beer are served and where a large number of bar tenders are employed.

It is also to be understood that the device possesses flexibility in that it can be used regardless of the distance between inlet pipe 3 and the upper surface of the bar 30. Where the distance is greater than that shown, a longer barrel 22 may be used, or if preferred, extensions can be mounted upon the barrel 22 by simply using a bolt 28 of proportionately greater length.

From the foregoing description it will be seen that I have provided a beverage indicator which positively prevents fraud and at the same time advertises the beverage being dispensed in an unusual manner. It will be noted that the sign holder 23 projecting unexpectedly above the upper surface of the counter 30 provides a means of immediately attracting the eye of a customer. It will also be seen that if desired the indicator may be placed on both sides of the sign holder 23 and when so placed the device will have the three functions of preventing fraud, advertising the brand, and quickly identifying the brand to the bar tender.

Other modes of applying the principle of my invention may be employed instead of the one explained, change being made as regards the means and the steps herein disclosed, provided those stated in any of the following claims, or their equivalent be employed.

I therefore particularly point out and distinctly claim as my invention:—

1. In apparatus of the character described a faucet having a handle, an indicator slidably mounted in a stationary support and means for moving said indicator, said means including a clamp upon said handle, a link connected thereto, and a lever connecting said link and indicator.

2. In apparatus of the character described, a faucet having a handle, an indicator and means connected to said handle for moving said indicator, said means including a link, a bell crank and a reciprocating barrel, said link having a pivotal connection with said handle said barrel being connected to said indicator, and being mounted in a stationary supporting member.

3. In apparatus of the character described, a faucet and an indicator, said faucet having an oscillating valve handle, and said indicator having a vertically reciprocating member connected thereto, said member being mounted in a stationary vertical support, means operatively associated with said handle and said member whereby oscillation of said handle produces reciprocation of said member.

4. In apparatus of the character described, a faucet and an indicator, said faucet having an oscillating valve handle, and said indicator having a vertically reciprocating member connected thereto, said member being mounted in a stationary vertical support, means operatively associated with said handle and said member whereby oscillation of said handle produces reciprocation of said member, and further means for restricting the movement of said indicator to a predetermined distance.

5. A device of the character described comprising, a spigot having a pivoted operating handle, a sign support for attachment to the spigot behind the handle thereon, said support having sign guide means a sign capable of being raised or lowered in said guide means by movement of the handle, and a connection between the operating handle and the sign by which the sign is vertically raised in its guiding means when the operating handle is moved to open the spigot, and lowered when the handle is moved to close the spigot.

6. A device of the character described comprising, a spigot having a movable operating handle, a sign guide having means for detachably securing it to the spigot, a sign member mounted for vertical sliding movement in said guide means, and means for connecting the sign member with the operating handle to cause the sign member to be raised in the guide means when the handle is moved in one direction and to cause the sign member to be lowered in the guide means when the handle is moved in an opposite direction.

ERIK J. MEUSNER.